(12) United States Patent
Burgin et al.

(10) Patent No.: US 9,448,702 B2
(45) Date of Patent: Sep. 20, 2016

(54) METHODS AND SYSTEMS FOR SELECTING A DISPLAYED AIRCRAFT APPROACH OR DEPARTURE

(71) Applicant: HONEYWELL INTERNATIONAL INC., Morristown, NJ (US)

(72) Inventors: Roger W. Burgin, Scottsdale, AZ (US); Pramod Kumar Malviya, Karnataka (IN); Dave Pepitone, Sun City West, AZ (US); Keith Hughes, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 202 days.

(21) Appl. No.: 13/889,493

(22) Filed: May 8, 2013

(65) Prior Publication Data

US 2014/0337796 A1    Nov. 13, 2014

(51) Int. Cl.
*G06F 3/0484* (2013.01)
*G01C 23/00* (2006.01)

(52) U.S. Cl.
CPC ........... *G06F 3/04842* (2013.01); *G01C 23/00* (2013.01)

(58) Field of Classification Search
CPC .................................................. G06F 3/04842
USPC ....................................................... 715/823
See application file for complete search history.

(56) References Cited

U.S. PATENT DOCUMENTS

| 6,112,141 | A  | * | 8/2000 | Briffe | ............ | G01C 23/00 |
| | | | | | | 345/1.3 |
| 6,633,810 | B1 | | 10/2003 | Qureshi et al. | | |
| 6,922,631 | B1 | | 7/2005 | Dwyer et al. | | |
| 7,809,479 | B2 | | 10/2010 | Chen et al. | | |
| 8,150,623 | B2 | | 4/2012 | Bitar et al. | | |
| 8,223,119 | B1 | | 7/2012 | Krenz et al. | | |
| 8,370,005 | B2 | | 2/2013 | Wilson et al. | | |
| 8,683,378 | B2 | * | 3/2014 | Bull | .................. | G06F 3/0485 |
| | | | | | | 345/156 |
| 9,115,995 | B1 | * | 8/2015 | Owen | .................. | G01C 23/00 |
| 2006/0195234 | A1 | | 8/2006 | Chen et al. | | |
| 2008/0177431 | A1 | | 7/2008 | Coulmeau et al. | | |
| 2009/0125222 | A1 | | 5/2009 | McCullough et al. | | |
| 2010/0039438 | A1 | | 2/2010 | Kennedy | | |
| 2010/0148990 | A1 | * | 6/2010 | Burgin | .............. | G08G 5/065 |
| | | | | | | 340/971 |
| 2011/0010082 | A1 | | 1/2011 | Wilson et al. | | |
| 2011/0313597 | A1 | | 12/2011 | Wilson et al. | | |
| 2011/0313598 | A1 | | 12/2011 | Coulmeau et al. | | |

(Continued)

FOREIGN PATENT DOCUMENTS

EP    2405417 A2    1/2012

OTHER PUBLICATIONS

EP Extended Search Report for Application No. 14165332.9 dated Mar. 16, 2015.

(Continued)

*Primary Examiner* — Amy Ng
*Assistant Examiner* — Seth A Silverman
(74) *Attorney, Agent, or Firm* — Lorenz & Kopf, LLP

(57) ABSTRACT

A system and method are provided for highlighting and selecting one of a plurality of graphical IFR procedure depiction on an aircraft display. A displayed legend includes a plurality of textual procedure identifications, one each for each of the graphical IFR procedure depictions. Movement of a cursor over either a graphical IFR procedure depiction or a textual procedure identification highlights both, and selection thereof removes all other graphical IFR procedure depictions and textual procedure identifications from being displayed.

20 Claims, 13 Drawing Sheets

(56) References Cited

U.S. PATENT DOCUMENTS

| | | | |
|---|---|---|---|
| 2012/0010765 A1* | 1/2012 | Wilson | G01C 23/00 701/3 |
| 2012/0095623 A1 | 4/2012 | Barral et al. | |
| 2012/0310450 A1* | 12/2012 | Srivastav | G08G 5/0021 701/3 |
| 2013/0036376 A1 | 2/2013 | Williams | |
| 2014/0097972 A1* | 4/2014 | Barraci | G01C 23/005 340/971 |

OTHER PUBLICATIONS

EP Communication for Application No. 14165332.9-1557 dated Sep. 17, 2015.

* cited by examiner

METHODS AND SYSTEMS FOR SELECTING A DISPLAYED AIRCRAFT APPROACH OR DEPARTURE

TECHNICAL FIELD

The exemplary embodiments described herein relate generally to avionics systems and more particularly to flight management systems and related cockpit displays adapted for indicating and selecting approaches and departures.

BACKGROUND

Worldwide air traffic is projected to double every ten to fourteen years and the International Civil Aviation Organization (ICAO) forecasts world air travel growth of five percent per annum until the year 2020. Such growth may have an influence on flight performance and may increase the workload of the flight crew. One such influence on flight performance has been the ability for the flight crew to determine appropriate Instrument Flight Rules (IFR) flight routes or alternate IFR procedures while paying attention to other matters within and outside of the cockpit, especially for approach to landing and departures from takeoff, which are probably the most challenging tasks a pilot undertakes during normal operation. The ability to easily and quickly make the proper determination of alternate IFR procedures can significantly improve situational awareness of the flight crew resulting in increased flight safety and performance by reducing the flight crew workload. An increase in pilot workload typically results in an increase in cognitive errors and a decreased attention span: the pilot must interpret and integrate the information provided from several sources occupying his thought processes when he may have many other decisions to make.

As terminal area operations increase in aircraft volume throughput, complexity, and required execution precision, pilots need to select the proper approach or departure procedure from what may be several dozen possible selections. For example, the Paris airport Le Bourget has approximately 125 approach procedures and 72 departure procedures.

Conventionally, a pilot would maintain copies of printed charts of approaches and departures and utilize the proper chart during flight. After identifying the proper chart, the pilot would locate the appropriate approach or departure that corresponds to the intended flight path of the aircraft. The published charts are oriented north-up and often require a pilot to manually rotate and position the chart to orient it based on the current heading of the aircraft. Additionally, these charts often included a variety of other information relating to the given navigational facility, further obfuscating the desired minimum safe altitude and maximum safe distance information. Thus, using and maintaining the printed charts is both cumbersome and confusing.

However, electronic instrumentation displays have generally replaced paper charts and continue to advance in sophistication, achieving increasingly higher levels of information density and, consequently, presenting a greater amount of visual information to be perceived and understood by the operator, e.g., the pilot. It is important that visual displays provide a proper cognitive mapping between what the operator is trying to achieve and the information available to accomplish the task.

Airport Moving Maps (AMM) are an overlay, for example, on a multi-function display/inertial navigation display (MFD/INAV), where approaches and departures may be shown on the display.

Data driven charts (DDC) have a powerful ability to integrate chart information with aircraft position and flight management system (FMS) procedural routing. This is a very crisp and concise way of presenting terrain and chart information especially around an airport terminal area.

Accordingly, it is desirable to provide a system and method for graphically displaying approaches and departures that may be easily understood by the pilot. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A method and system are provided for displaying a selected graphical IFR procedure depiction on a display.

A first exemplary embodiment describes a method for a display system to display a selected graphical IFR procedure depiction on a display, comprising highlighting a textual procedure identification of a plurality of textual procedure identifications displayed in a list and a graphical IFR procedure depiction of a plurality of graphical IFR procedure depictions displayed on a lateral view of a moving map when a cursor is moved over the textual procedure identification or the graphical IFR procedure depiction, the textual procedure identification associated with the graphical IFR procedure depiction; characterizing the highlighted textual procedure identification and the highlighted graphical IFR procedure depiction as selected; and removing the textual procedure identifications from the list and the graphical IFR procedure depictions from the lateral view other than the selected textual procedure identification and graphical IFR procedure depiction.

A second exemplary embodiment describes a method for a display system to display a selected graphical IFR procedure depiction on a display, comprising highlighting a textual procedure identification of a plurality of textual procedure identifications displayed in a list and a graphical IFR procedure depiction of a plurality of graphical IFR procedure depictions displayed on a lateral view of a moving map when one of the textual procedure identification or the graphical IFR procedure depiction is identified, the textual procedure identification associated with the graphical IFR procedure depiction; characterizing the identified textual procedure identification and the identified graphical IFR procedure depiction as selected; and removing the textual procedure identifications from the list and the graphical IFR procedure depictions from the lateral view other than the selected textual procedure identification and graphical IFR procedure depiction.

A third exemplary embodiment describes a display system for displaying a plurality of textual procedure identifications and a plurality of graphical IFR procedure depictions, the display system comprising a system configured to determine the plurality of textual procedure identifications for display in a legend, and the plurality of graphical IFR procedure depictions for display on a lateral view of a moving map, each of the textual procedure identifications associated with one of the graphical IFR procedure depictions; a processor coupled to the system and configured to highlight one of the textual procedure identifications and an associated graphical IFR procedure depiction when a cursor is moved over the textual procedure identification or the graphical IFR procedure depiction; characterize the highlighted textual procedure identification and the graphical IFR procedure depiction as selected in response a command from the system; and remove the textual procedure identifications from the list and the graphical IFR procedure depictions from the lateral view other than the selected textual procedure identification and graphical IFR procedure depiction.

BRIEF DESCRIPTION OF THE DRAWINGS

The present invention will hereinafter be described in conjunction with the following drawing figures, wherein like numerals denote like elements.

DETAILED DESCRIPTION

Figure 1:
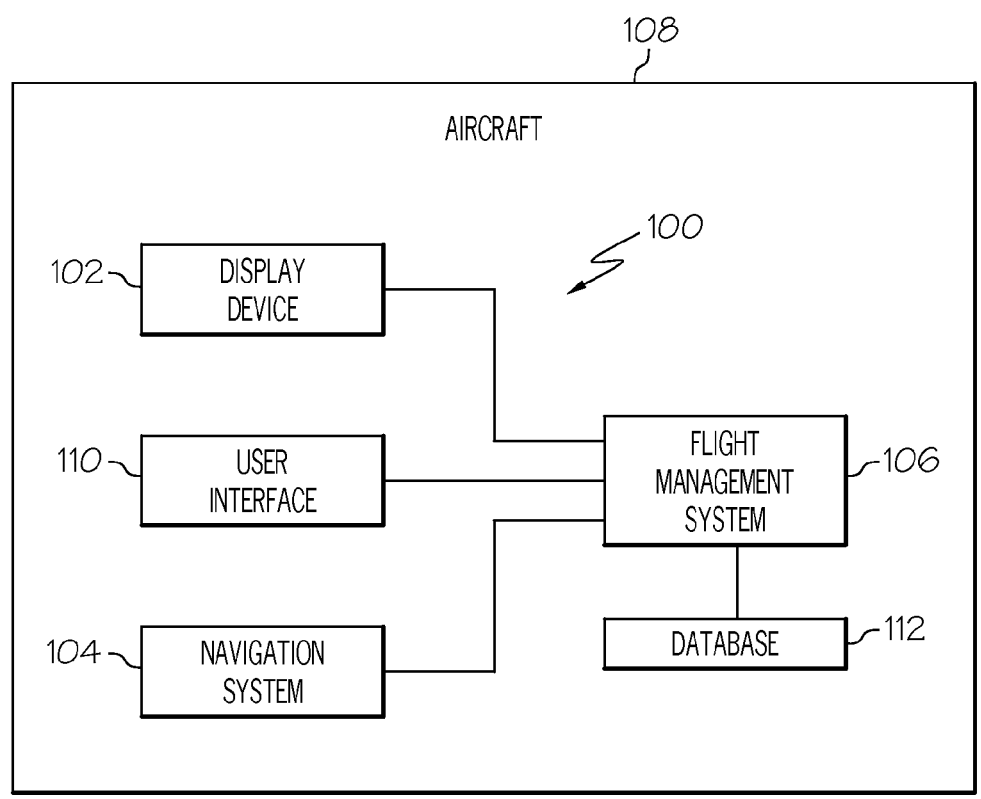
FIG. 1 is a block diagram of a known display system suitable for use in an aircraft in accordance with the exemplary embodiments described herein.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Technologies and concepts discussed herein relate to flight management systems adapted for indicating, on a display device associated with an aircraft, whether the aircraft is within the designated criteria for a procedure turn. If the aircraft is below a designated minimum safe altitude, or exceeding a designated distance from the navigation point, the procedure turn is displayed using a first visually distinguishable characteristic which indicates noncompliance with the criteria. Otherwise, if the aircraft is above the designated minimum safe altitude and within the designated distance, the sector is displayed using a second visually distinguishable characteristic which indicates compliance with the criteria.

The mapping methods described herein may be used with a variety of aircraft, such as planes and helicopters. The aviation environment is described herein as the exemplary embodiment and may include navigation from point to point or approach and landing at an airport. Generally a lateral view display is presented in conjunction with the vertical view presented herein. Various types of maps may be used for display on the lateral view, for example, road maps, terrain maps, aviation maps, and topographical maps.

Some applications may require more than one monitor, for example, a head down display screen, to accomplish the mission. These monitors may include a two dimensional moving map display and a three dimensional perspective display. A moving map display may include a top-down view of the aircraft, the flight plan, and the surrounding environment. Various symbols are utilized to denote navigational cues (e.g., waypoint symbols, line segments interconnecting the waypoint symbols, range rings) and nearby environmental features (e.g., terrain, weather conditions, political boundaries, etc).

Alternate embodiments of the present invention to those described below may utilize whatever navigation system signals are available, for example a ground based navigational system, a GPS navigation aid, a flight management system, and an inertial navigation system, to dynamically calibrate and determine a precise course.

In accordance with the exemplary embodiments, a moving map displays various landmarks, for example, a runway; navigational aids, for example, a VORTAC, in the vicinity of the aircraft; and a plurality of graphical IFR procedure depictions, for example, standard terminal arrival routes (STARS), STAR transitions, approaches, approach transitions, and standard instrument departures (SIDS). A legend, or list, is also displayed, preferably on a side or in a corner of the display, and includes a plurality of textual procedure identifications, one each for each of the graphical IFR procedure depictions. For example, the textual procedure identification RICHY represents a graphical IFR procedure depictions (an approach) into Reno/Tahoe International Airport. In one exemplary embodiment, the pilot may identify one of the graphical IFR procedure depictions or one of the associated textual procedure identification from the legend, causing both the graphical IFR procedure depiction and the associated textual procedure identification to be highlighted. This selection quickly illustrates to the pilot the position of the graphical IFR procedure depictions on the map and the associated textual procedure identification (title). The highlighting of the graphical IFR procedure depiction and the associated textual procedure identification may be made in any one of a plurality of ways known in the computer technology; however, the preferred method would be by a moving curser over the graphical IFR procedure depiction or the textual procedure identification. If the highlighted graphical IFR procedure depiction and the associated textual procedure identification are desired, the pilot may select that graphical IFR procedure depiction and the associated textual procedure identification, for example, by clicking a button on the cursor control device. In another exemplary embodiment, the selection may be automatic by the system sensing the cursor over the graphical IFR procedure depiction and the associated textual procedure identification for a period of time. When selected, the other graphical IFR procedure depictions and the associated textual procedure identifications are removed from the display and the legend, and when the selection is entered into the flight plan, the legend may be removed from the display.

The legend may display only a portion of the plurality of textual procedure identification due to the large number of textual procedure identifications. When the pilot moves the cursor over the graphical IFR procedure depiction, the listing of the associated textual procedure identifications will scroll until the associated textual procedure identification is displayed.

FIG. 1 depicts an exemplary embodiment of a display system 100, which may be located onboard an aircraft 108. This embodiment of display system 100 may include, without limitation, a display device 102, a navigation system 104, and a flight management system 106 (FMS). The display system 100 may further include a user interface 110 for enabling interactivity with the display system 100. The display system 100 may also include a database 112 suitably configured to support operation of the display system 100 as described in greater detail below.

It should be understood that FIG. 1 is a simplified representation of a display system 100 for purposes of explanation and ease of description, and FIG. 1 is not intended to limit the application or scope of the subject matter in any way. In practice, the display system 100 and/or aircraft 108 will include numerous other devices and components for providing additional functions and features, as will be appreciated in the art.

In an exemplary embodiment, the display device 102 is coupled to the flight management system 106. The flight management system 106 is coupled to the navigation system 104 for obtaining real-time data and/or information regarding operation of the aircraft 108. The flight management system 106 is configured to display, render, or otherwise convey one or more graphical representations or images associated with operation of the aircraft 108 on the display device 102, as described in greater detail below. In accordance with one or more embodiments, the flight management system 106 is configured to determine and indicate on the display device 102 graphical IFR procedure depictions on a lateral map and associated textual procedure identifications in a legend. In this regard, the user interface 110 may be coupled to the flight management system 106 to allow a pilot and/or crew member to highlight and select a desired graphical IFR procedure depiction and the associated textual procedure identification, as described in greater detail below.

In an exemplary embodiment, the display device 102 is realized as an electronic display configured to graphically display flight information or other data associated with operation of the aircraft 108 under control of the flight management system 106, as will be understood. In an exemplary embodiment, the display device 102 is located within a cockpit of the aircraft 108. It will be appreciated that although FIG. 1 shows a single display device 102, in practice, additional display devices may be present onboard the aircraft 108. The user interface 110 may also be located within the cockpit of the aircraft 108 and adapted to allow a user (e.g., pilot, co-pilot, or crew member) to interact with the flight management system 106, as described in greater detail below. In various embodiments, the user interface 110 may be realized as a keypad, touchpad, keyboard, mouse, touchscreen, joystick, or another suitable device adapted to receive input from a user. In an exemplary embodiment, the user interface 110 and flight management system 106 are cooperatively configured to enable a user to highlight and select a desired graphical IFR procedure depiction and the associated textual procedure identification, as described below.

The display 102 is configured to provide the enhanced images to the operator. In accordance with an exemplary embodiment, the display 102 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 102 may additionally be implemented as a panel mounted display, a HUD (head-up display) projection, or any one of numerous known technologies. It is additionally noted that the display 102 may be configured as any one of numerous types of aircraft flight deck displays. For example, it may be configured as a multi-function display, a horizontal situation indicator, or a vertical situation indicator. In the depicted embodiment, however, the display 102 is configured as a primary flight display (PFD).

In operation, the display device 102 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other known devices. The data provided by the sources of flight status data may include, without limitation: airspeed data; groundspeed data; altitude data; attitude data, including pitch data and roll data; yaw data; geographic position data, such as GPS data; time/date information; heading information;

weather information; flight path data; track data; radar altitude data; geometric altitude data; wind speed data; wind direction data; etc. The display system 102 is suitably designed to process data obtained from the sources of flight status data in the manner described in more detail herein. In particular, the display device 102 can use the flight status data of the host aircraft when rendering the display.

It should be appreciated that although FIG. 1 shows the display device 102 and user interface 110 within the aircraft 108, in practice, either or both may be located outside the aircraft 108 (e.g., on the ground as part of an air traffic control center or another command center) and communicatively coupled to the flight management system 106 over a data link. For example, the display device 102 and/or user interface 110 may communicate with the flight management system 106 using a radio communication system or another data link system, such as a controller pilot data link (CPDL).

In an exemplary embodiment, the navigation system 104 is configured to obtain one or more navigational parameters associated with operation of the aircraft 108. The navigation system 104 may be realized as a global positioning system (GPS), inertial reference system (IRS), or a radio-based navigation system (e.g., VHF omni-directional radio range (VOR) or long range aid to navigation (LORAN)), and may include one or more sensors suitably configured to support operation of the navigation system 104, as will be appreciated in the art. In this regard, navigation system 104 may communicate with one or more navigational aids, as will be understood. In an exemplary embodiment, the navigation system 104 is capable of obtaining and/or determining the current location of the aircraft 108, e.g., the latitude and longitude, and the heading of the aircraft 108, i.e., the direction the aircraft is traveling in relative to some reference, and providing these navigational parameters to the flight management system 106.

In an exemplary embodiment, the flight management system 106 (or, alternatively, a flight management computer) is located onboard the aircraft 108. Although FIG. 1 is a simplified representation of display system 100, in practice, the flight management system 106 may be coupled to one or more additional modules or components as necessary to support navigation, flight planning, and other aircraft control functions in a conventional manner. In an exemplary embodiment, the flight management system 106 is configured to obtain and/or determine the instantaneous altitude of the aircraft 108. In addition, the flight management system 106 may include or otherwise access a database or other navigational information for rendering a navigational map on the display device 102, as described below. The navigational map may be based on one or more sectional charts, topographic maps, digital maps, or any other suitable commercial or military database or map, as will be appreciated in the art.

In an exemplary embodiment, the flight management system 106 accesses or includes a database 112 that contains designated minimum safe altitude and maximum safe distance information for a plurality of known procedure turns. The navigational reference points may comprise navigational aids, such as VHF omni-directional ranges (VORs), distance measuring equipment (DMEs), tactical air navigation aids (TACANs), and combinations thereof (e.g., VORTACs). As used herein, "navigational reference point" and variants thereof should also be understood as encompassing position fixes, such as initial approach fixes (IAFs), final approach fixes (FAFs) and other navigational reference points used in area navigation (RNAV). In an exemplary embodiment, the navigational reference points are located near a landing location (e.g., an airport). In this regard, the landing location and/or navigational reference point may have one or more graphical IFR procedure depictions and associated textual procedure identifications.

Figure 2:
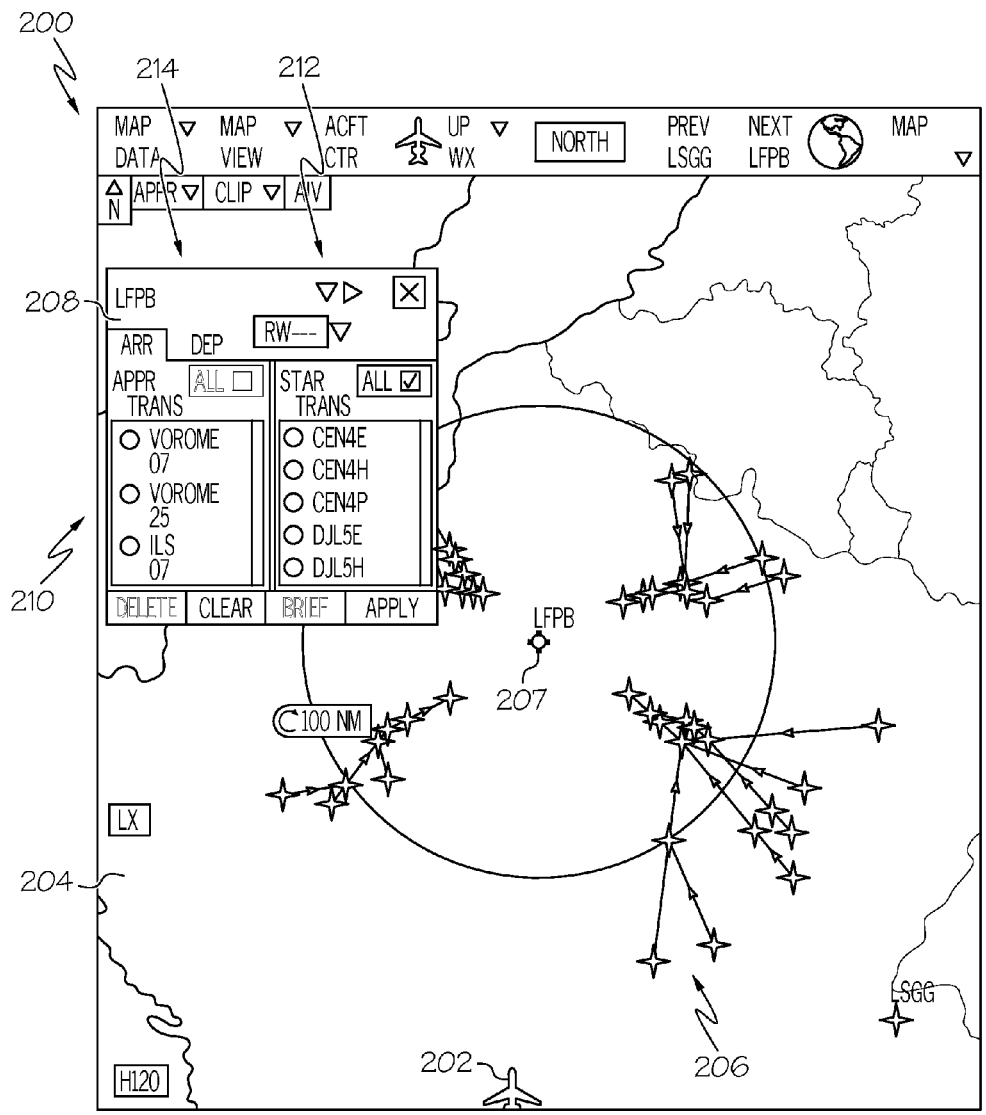
FIGS. 2-4 are schematic views of a navigational map illustrating steps in accordance with a first exemplary embodiment and suitable for use with the display system of FIG. 1.

Referring now to FIG. 2, and with continued reference to FIG. 1, the flight management system 106 is configured to control the rendering of a navigational map 200 graphically displayed on the display device 102. The flight management system 106 may also be configured to render a graphical representation of an aircraft 202 on the map 200, which may be overlaid or rendered on top of a background 204. The background 204 may be a graphical representation of the terrain, topology, or other suitable items or points of interest, which may be maintained by the flight management system 106 in a database 112, as will be understood. As described in greater detail below, the flight management system 106 may also render the graphical IFR procedure depictions 206 (in this embodiment, STARS) and a legend 208 containing the associated textual procedure identifications 210. The legend 208 displays IFR arrival, departure or instrument approach procedures. Through the active legend 208, a pilot can view and/or select the appropriate IFR procedure. In addition, if the pilot 'drags' the cursor over a graphical procedure on the moving map display, then that procedure is also highlighted in the legend box. The flight management system 106 may be configured to render or display a graphical representation of the landing location 207 on the navigational map 200, as will be understood.

Although FIG. 2 depicts a lateral view (e.g., from above the aircraft 202) of the navigational map 200, in practice, alternative embodiments may utilize various perspective views, such as side views, three-dimensional views (e.g., a three-dimensional synthetic vision display), angular or skewed views, and the like. Further, in some embodiments, the aircraft 202 preferably is shown as traveling across the map 200, typically referred to as a moving map, as opposed to being located at a fixed position on the map 200, and FIG. 2 does not limit the scope of the subject matter in any way.

In another exemplary embodiment, the map 200 is associated with the movement of the aircraft, and the background 204 refreshes or updates as the aircraft travels, such that the graphical representation of the aircraft 202 is positioned over the background 204 in a manner that accurately reflects the instantaneous (or substantially real-time) real-world positioning of the aircraft 202 relative to the earth. In accordance with one embodiment, the map 200 is updated or refreshed such that it is centered on and/or aligned with the aircraft 202. Although the navigational map 200 shown in FIG. 2 is oriented north-up (i.e., moving upward on the map 200 corresponds to traveling northward), as described below, in other embodiments, the navigational map 200 may be oriented track-up or heading-up, i.e., aligned such that the aircraft 202 is always traveling in an upward direction and the background 204 adjusted accordingly.

Optionally, a vertical profile (not shown) may be displayed on the navigational map 200, including navigation reference points, the landing location 207, and an approach path.

The legend 208, or list, of the textual procedure identifications 210, is preferably displayed on a side or in a corner of the display screen so as to not interfere with the remainder of the information displayed. Each textual procedure identifications 210 in the column 212 represents one of the graphical IFR procedure depictions 206 a STAR (in this exemplary embodiment) displayed on the display screen 200. The textual procedure identifications 210 in the column 214 represents an approach, associated with a STAR, to the actual landing location 207. As is seen, there are many graphical IFR procedure depictions 206 displayed on the map 200, which may make it difficult for the pilot to determine which graphical IFR procedure depiction 206 he is to follow. Also with traditional charts, these IFR procedure depictions 206 are shown on many separate charts making it difficult to see differences and advantages between each procedure. By displaying all the STARs or STAR transitions graphically, the pilot can make better choices of which route is the best. Furthermore, with so many graphical IFR procedure depictions 206, the listing of the textual procedure identifications 210 are also so numerous so not all of the associated textual procedure identifications 210 can be displayed in the column 212.

Figure 3:
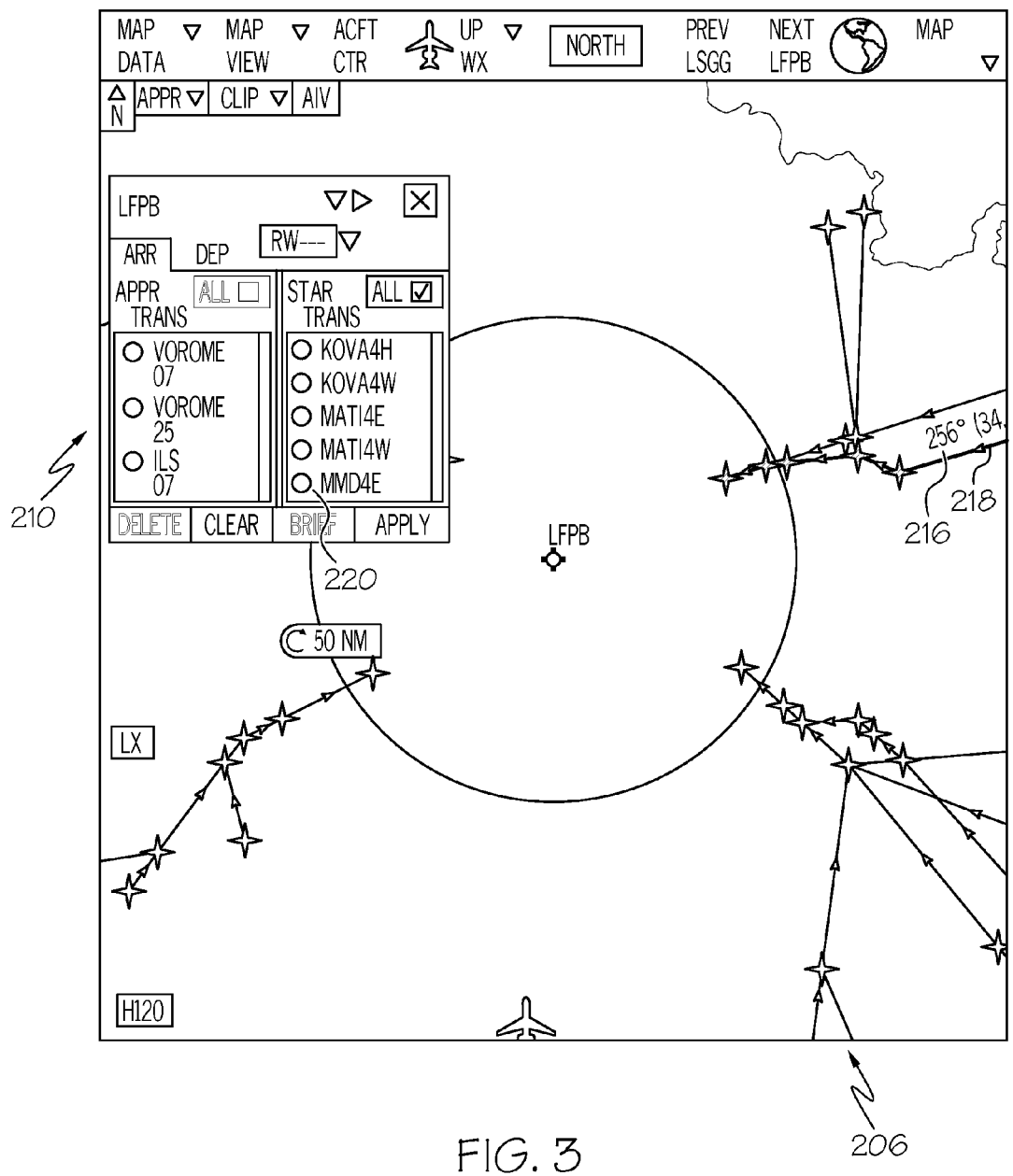

Referring to FIG. 3 and in accordance with the first exemplary embodiment, a cursor 216 is moved over either the STAR 218 or the textual procedure identification 220, causing the STAR 218 and the textual procedure identification 220 to be highlighted. If the textual procedure identification 220 was not visible (within the range of textual procedure identifications 210 being displayed) prior to moving the cursor, the textual procedure identifications 210 will scroll so as to display the appropriate textual procedure identification 220. Highlighting as used herein means modifying the format of the graphical IFR procedure depictions 206 and tpi to distinguish from other graphical IFR procedure depictions 206 and textual procedure identifications 210. The highlighting may, for example, be a changing of color or brightness. And while a cursor is taught in the exemplary embodiments described herein, other methods known in the computer industry may be used to highlight and select the desired graphical IFR procedure depiction 206 and textual procedure identification 210.

Figure 4:
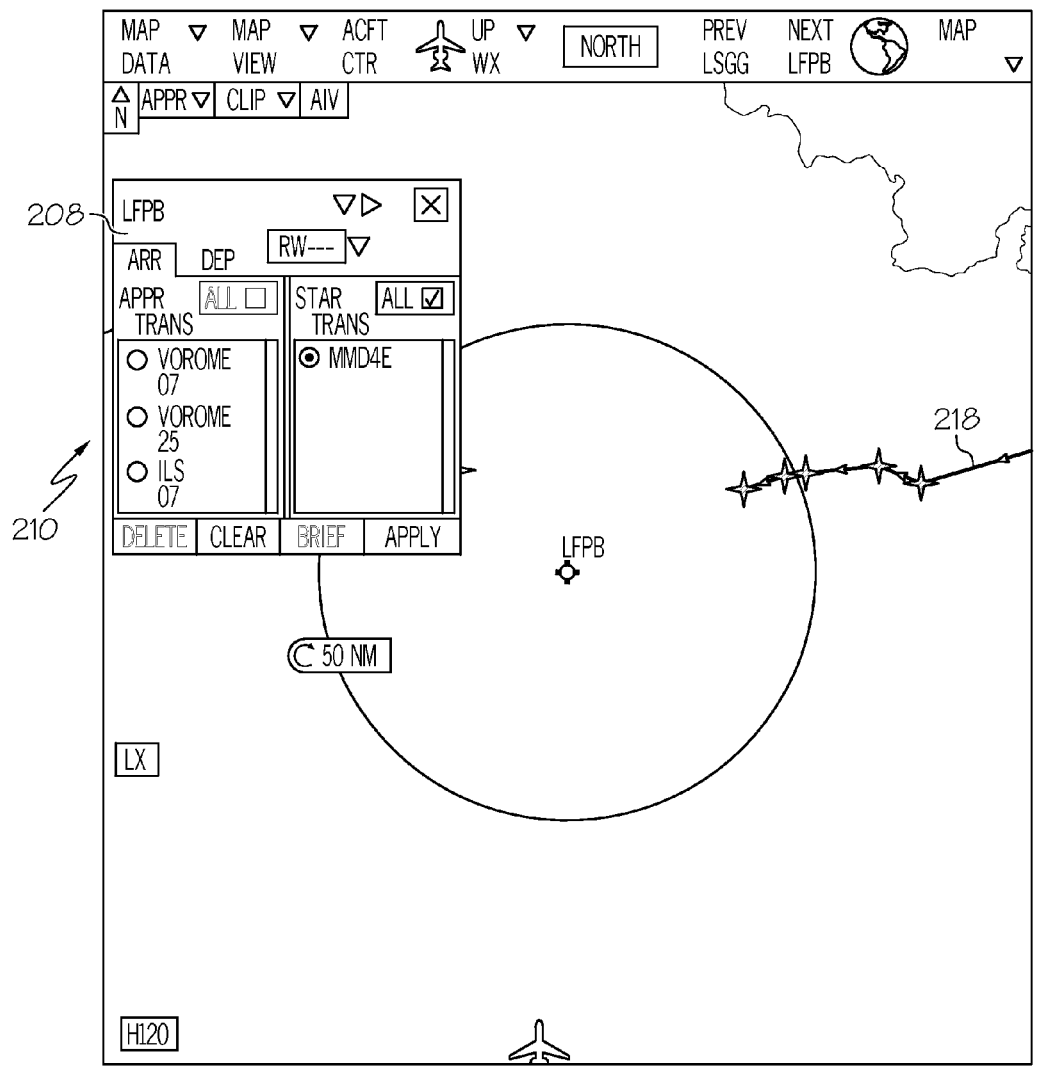

If the pilot determines the highlighted graphical IFR procedure depiction 206 and textual procedure identification 210 are as desired, he would simply select either the highlighted graphical IFR procedure depiction 206 or the textual procedure identification 210, for example, by clicking a push button. When the selection is made, the other graphical IFR procedure depictions 206 and textual procedure identifications 210 would be removed from the display 200 (see FIG. 4).

While the exemplary embodiments described herein display approaches or departures 206, the invention is applicable to any movement of an aircraft 204 from one point to another.

Figure 5:
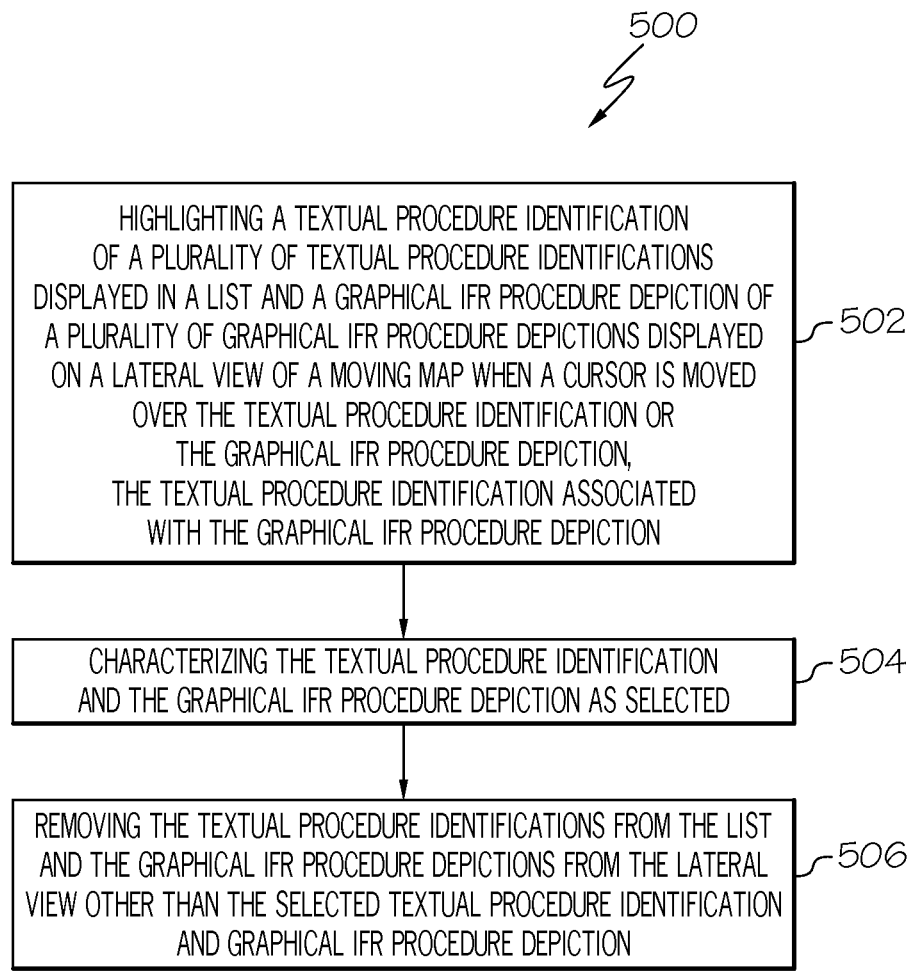
FIG. 5 a flow diagram of an exemplary method suitable for use with the display system of FIG. 1 in accordance with the exemplary embodiments.

FIG. 5 is a flow chart that illustrates an exemplary embodiment of a method 500 suitable for use with a flight deck display system 100. Method 500 represents one implementation of a method for displaying aircraft approaches or departures on an onboard display of a host aircraft. The various tasks performed in connection with method 500 may be performed by software, hardware, firmware, or any combination thereof. For illustrative purposes, the following description of method 500 may refer to elements mentioned above in connection with preceding FIGS. In practice, portions of method 500 may be performed by different elements of the described system, e.g., a processor, a display element, or a data communication component. It should be appreciated that method 500 may include any number of additional or alternative tasks, the tasks shown in FIG. 5 need not be performed in the illustrated order, and method 500 may be incorporated into a more comprehensive procedure or method having additional functionality not described in detail herein. Moreover, one or more of the tasks shown in FIG. 5 could be omitted from an embodiment of the method 500 as long as the intended overall functionality remains intact.

In accordance with the exemplary method of FIG. 5, a method for a display system to display a selected graphical IFR procedure on a display includes highlighting 502 a textual procedure identification of a plurality of textual procedure identifications displayed in a list and a graphical IFR procedure depiction of a plurality of graphical IFR procedure depictions displayed on a lateral view of a moving map when a cursor is moved over the textual procedure identification or the graphical IFR procedure depiction, the textual procedure identification associated with the graphical IFR procedure depiction; characterizing 504 the textual procedure identification and the graphical IFR procedure depiction as selected; and removing 506 the textual procedure identifications from the list and the graphical IFR procedure depictions from the lateral view other than the selected textual procedure identification and graphical IFR procedure depiction.

Figure 6:
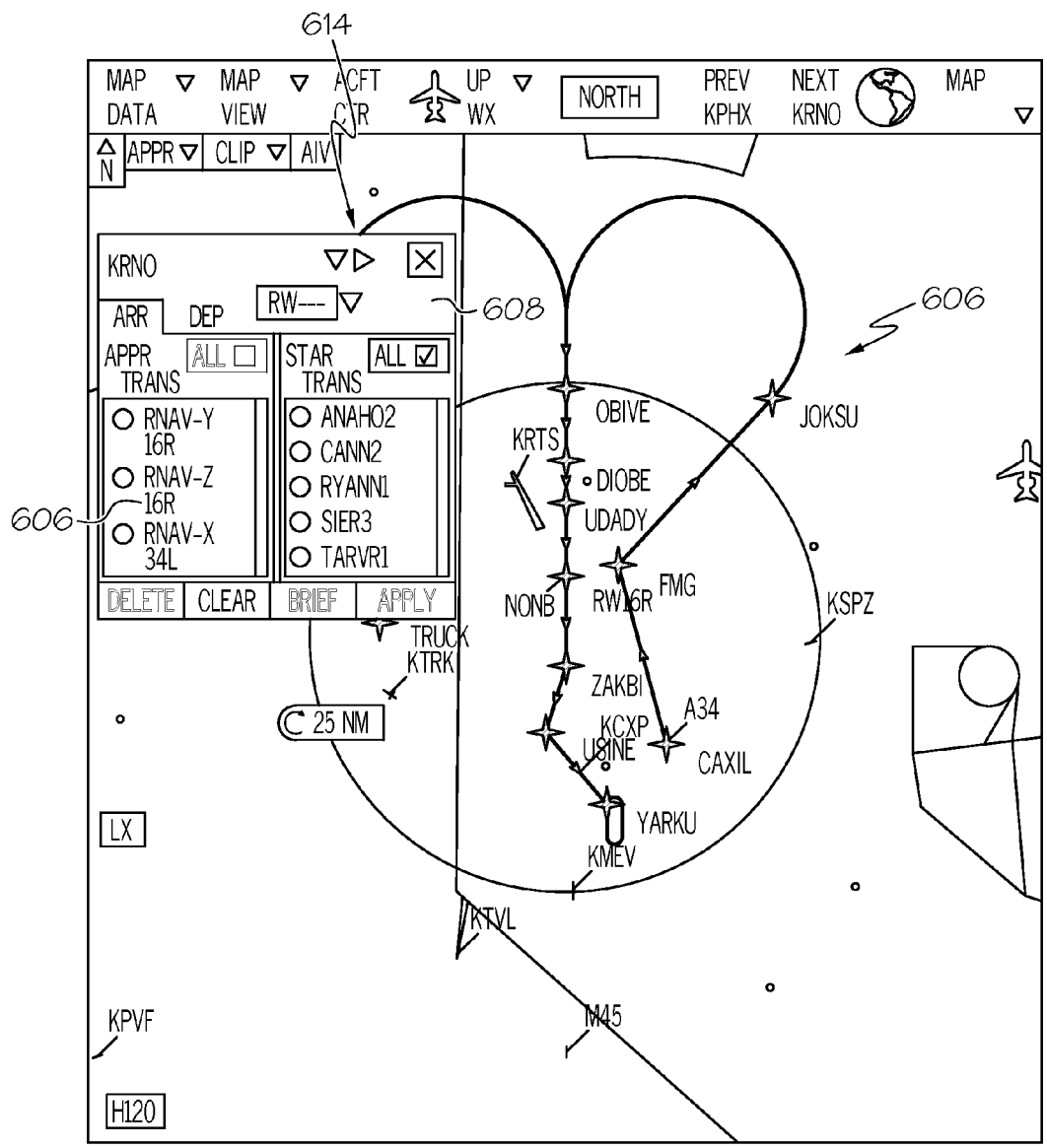
FIGS. 6-10 are schematic views of a navigational map illustrating steps in accordance with a second exemplary embodiment and suitable for use with the display system of FIG. 1.

After completing flying a STAR, the pilot must navigate a transition and approach (FIGS. 6-10) to the airport. Referring to FIG. 6, when the number of graphical IFR procedures 606 (approaches) is large and displaying them all would be confusing to the pilot, only a few of the graphical IFR procedures 606 might be displayed on the lateral map 600. However, all of the textual procedure identifications in column 614 for the graphical IFR procedures would be included in the legend 608. Note in FIG. 6, only graphical IFR procedures 606 for runway 16R are displayed. However, when the pilot highlights the textual procedure identification for RW34L, the graphical IFR procedure 620 for runway 34L is displayed (FIG. 7), as well as the transitions 622 for the graphical IFR procedure 620.

The second exemplary embodiment includes the flight management system 106 configured to control the rendering of a navigational map 600 graphically displayed on the display device 102. The flight management system 106 may also be configured to render a graphical representation of an aircraft 602 on the map 600, which may be overlaid or rendered on top of a background 604. The background 604 may be a graphical representation of the terrain, topology, or other suitable items or points of interest, which may be maintained by the flight management system 106 in a database 112, as will be understood. As described in greater detail below, the flight management system 106 may also render the graphical IFR procedure depictions 606 (in this embodiment, SIDS) and a legend 608 containing the associated textual procedure identifications 610. The flight management system 106 may be configured to render or display a graphical representation of the landing location 607 on the navigational map 600, as will be understood.

Although FIG. 6 depicts a lateral view, e.g., from above the aircraft 602, of the navigational map 600, in practice, alternative embodiments may utilize various perspective views, such as vertical profile, three-dimensional views, e.g., a three-dimensional synthetic vision display, angular or skewed views, and the like. Further, in some embodiments, the aircraft 602 preferably is shown as traveling across the map 600, typically referred to as a moving map, as opposed to being located at a fixed position on the map 600, and FIG. 6 does not limit the scope of the subject matter in any way.

In another exemplary embodiment, the map 600 is associated with the movement of the aircraft, and the background 604 refreshes or updates as the aircraft travels, such that the graphical representation of the aircraft 602 is positioned over the background 604 in a manner that accurately reflects the instantaneous (or substantially real-time) real-world positioning of the aircraft 602 relative to the earth. In accordance with one embodiment, the map 600 is updated or refreshed such that it is centered on and/or aligned with the aircraft 602. Although the navigational map 600 shown in FIG. 6 is oriented north-up, i.e., moving upward on the map 600 corresponds to traveling northward, as described below, in other embodiments, the navigational map 600 may be oriented track-up or heading-up, i.e., aligned such that the aircraft 602 is always traveling in an upward direction and the background 604 adjusted accordingly.

Optionally, a vertical profile (not shown) may be displayed on the navigational map 600, including navigation reference points, the landing location 607, and an approach path.

The legend 608, or list, of the textual procedure identifications 610, is preferably displayed on a side or in a corner of the display screen so as to not interfere with the remainder of the information displayed. Each textual procedure identification 610 in the column 612 represents one of the graphical IFR procedure depictions 606, e.g., an approach with two approach transitions (in this exemplary embodiment) displayed on the display screen 600. The textual procedure identifications 610 in the column 614 represents an flight path, associated with an approach, to the actual landing location 607. As is seen, there are many graphical IFR procedure depictions 606 displayed on the map 600, which may make it difficult for the pilot to determine which graphical IFR procedure depiction 606 he is to follow. Furthermore, with so many graphical IFR procedure depictions 606, the listing of the textual procedure identifications 610 are also so numerous so not all of the associated textual procedure identifications 610 can be displayed in the column 612.

Figure 7:
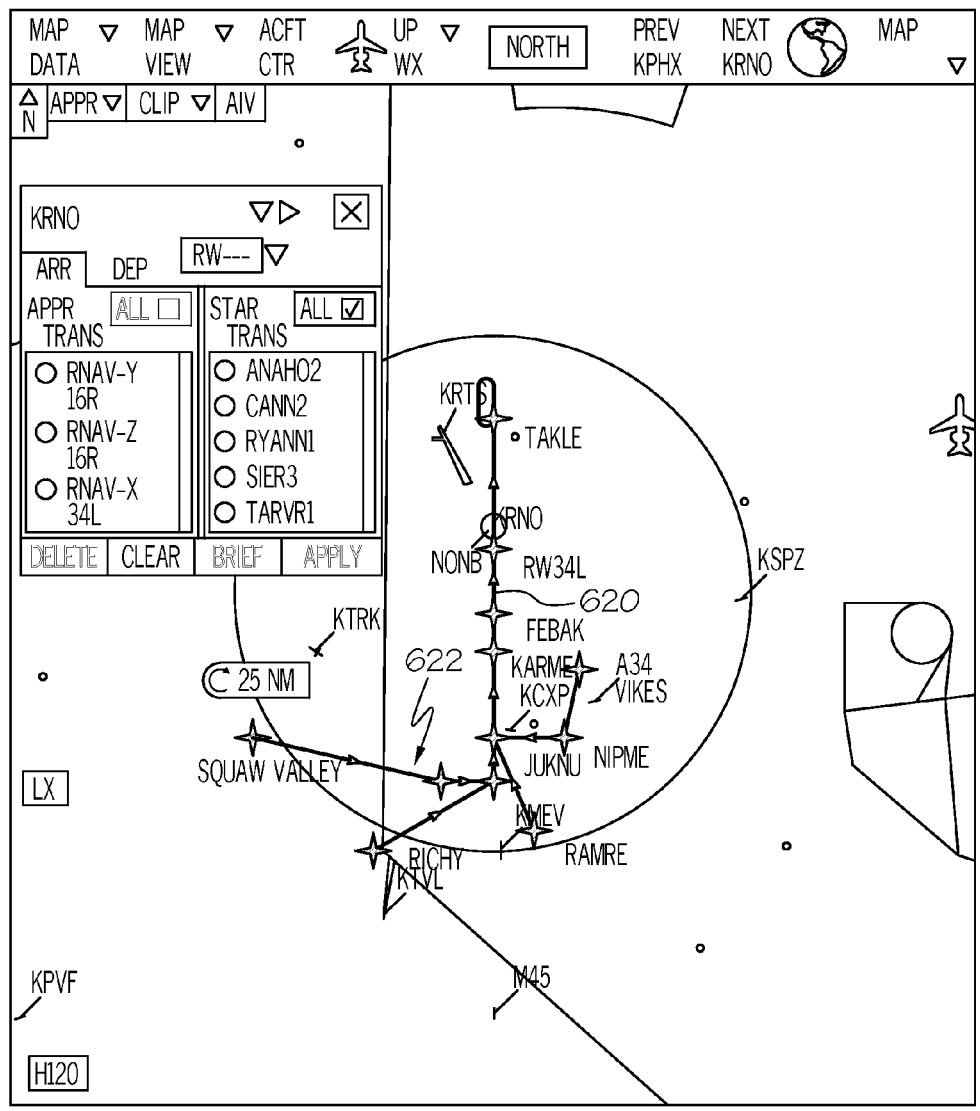

Referring to FIG. 7, an additional approach RNAV-X 34L is displayed on the moving map as the cursor is moved over the textual procedure identification 602, illustrating to the pilot an additional approach procedure for consideration.

Figure 8:
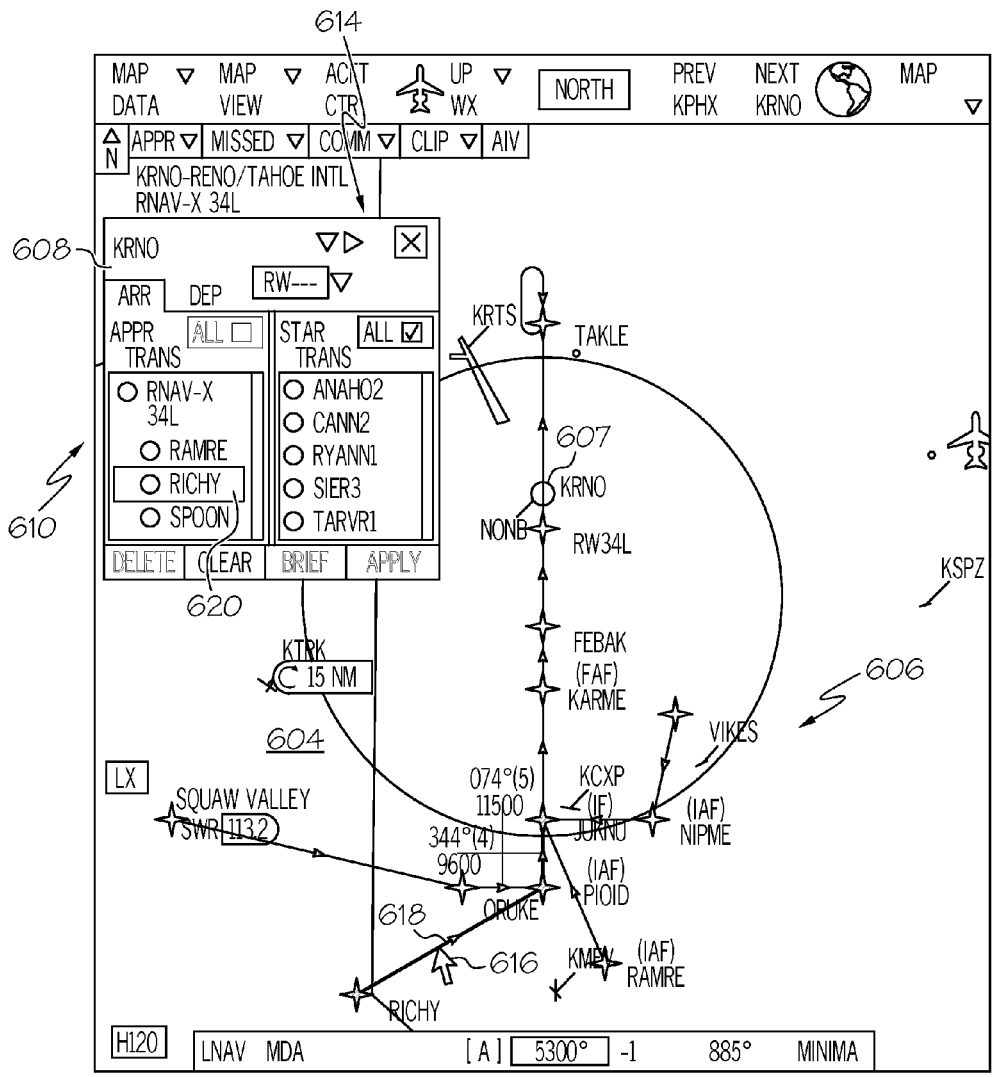
Figure 9:
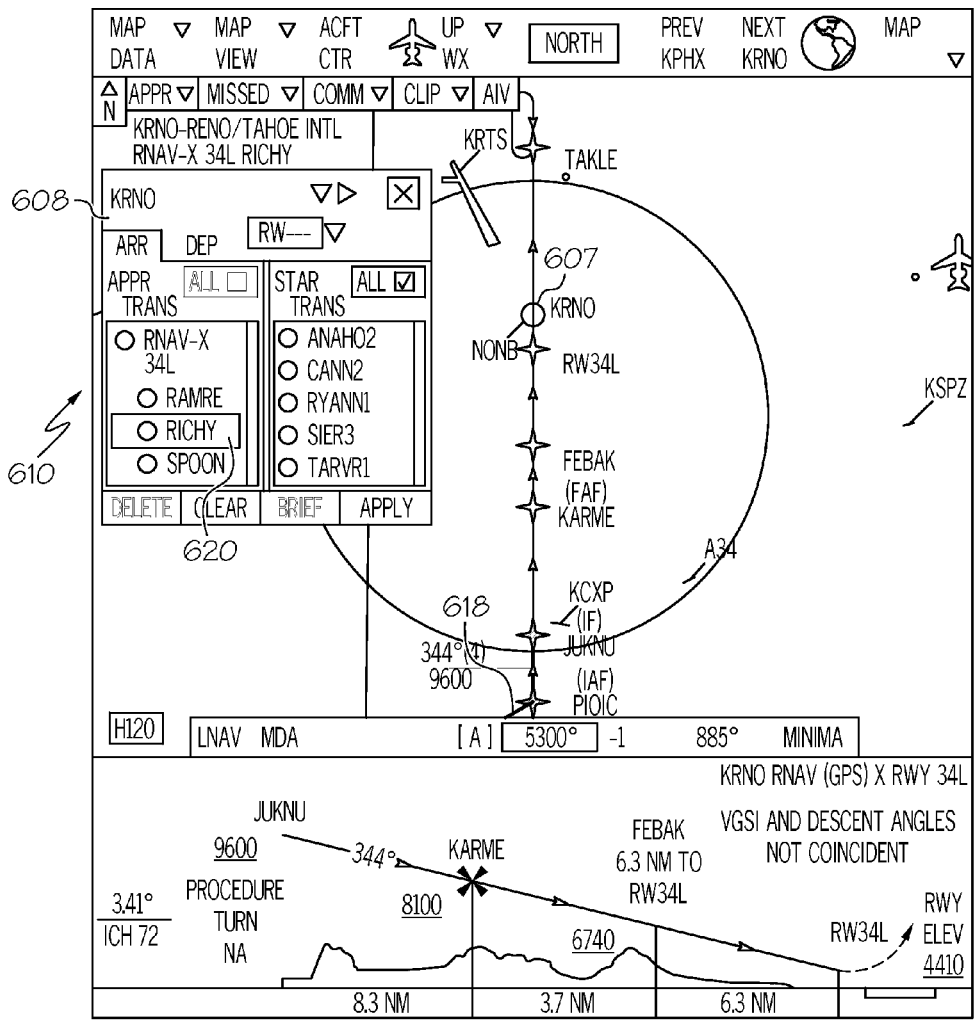
Figure 10:
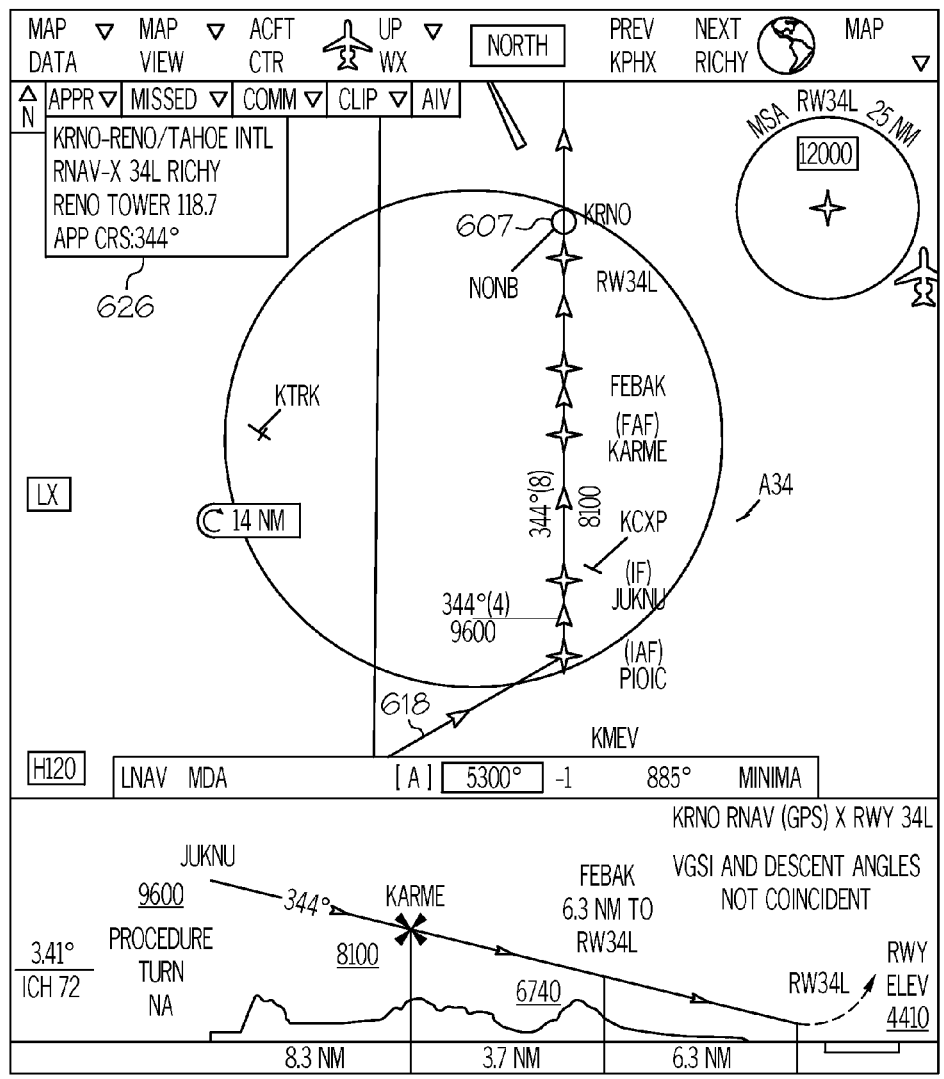

Referring to FIG. 8 and in accordance with the third exemplary embodiment, a cursor 616 is moved over either the approach 618 or the textual procedure identification 620, causing the approach 618 and the textual procedure identification 620 to be highlighted. If the textual procedure identification 620 was not visible (within the range of textual procedure identifications 610 being displayed) prior to moving the cursor, the textual procedure identifications 610 will scroll so as to display the appropriate textual procedure identification 620. Highlighting as used herein means modifying the format of the graphical IFR procedure depiction 606 and textual procedure identifications 610 to distinguish from other graphical IFR procedure depictions 606 and textual procedure identifications 610. The highlighting may, for example, be a changing of color or brightness. And while a cursor is taught in the exemplary embodiments described herein, other methods known in the computer industry may be used to highlight and select the desired graphical IFR procedure depiction 606 and textual procedure identification 610.

If the pilot determines the highlighted graphical IFR procedure depiction 606 and textual procedure identification 610 are as desired, he would simply select either the highlighted graphical IFR procedure depiction 606 or the textual procedure identification 610, for example, by clicking a push button. When the selection is made, the other graphical IFR procedure depictions 606 and textual procedure identifications 610 would be removed from the display 600 (see FIG. 9). In one exemplary embodiment, when the approach and transition have been selected, the legend 608 is removed from the display and the approach descriptive information 626 is displayed.

Figure 11:
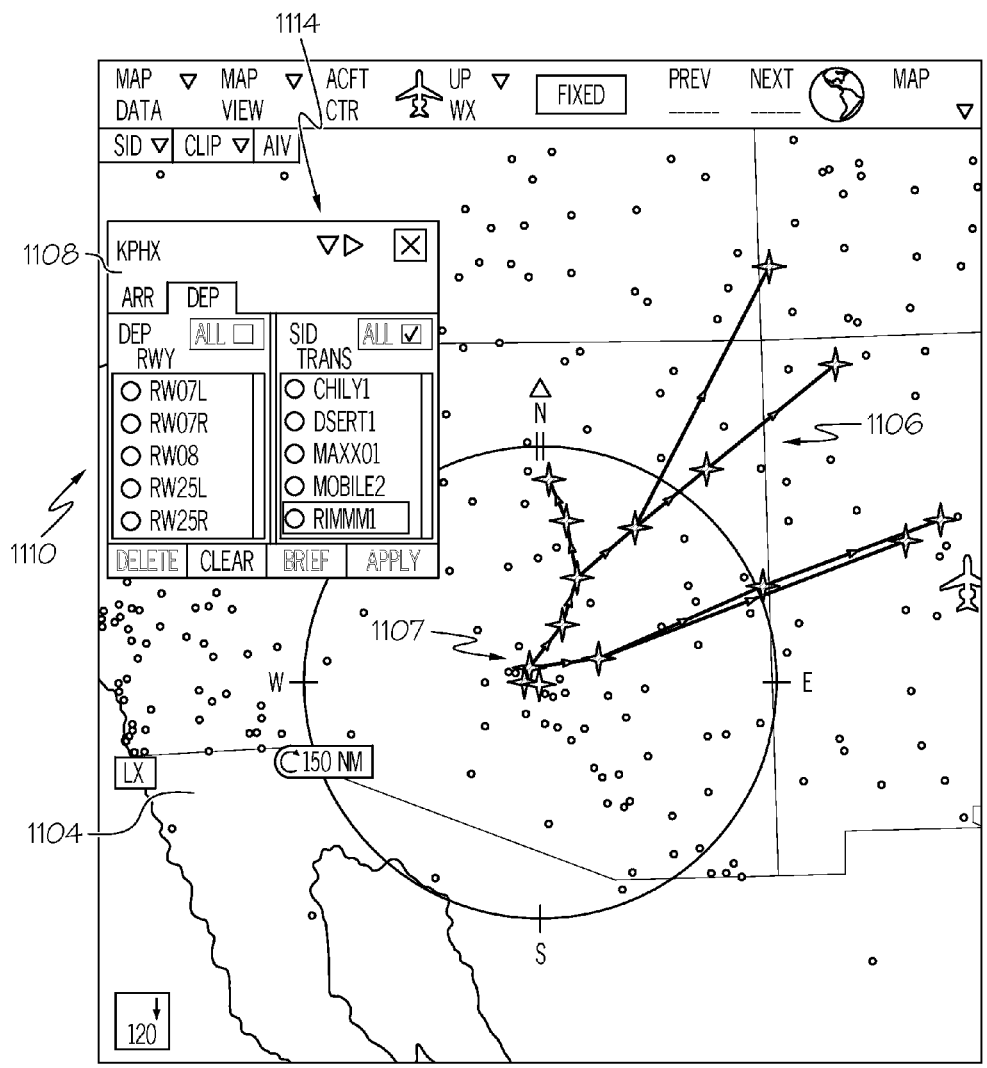
FIGS. 11-13 are schematic views of a navigational map illustrating steps in accordance with a third exemplary embodiment and suitable for use with the display system of FIG. 1.

Referring to FIG. 11, a third exemplary embodiment includes the flight management system 106 configured to control the rendering of a navigational map 1100 graphically displayed on the display device 102. The flight management system 106 may also be configured to render a graphical representation of an aircraft (not shown) on the map 1100, which may be overlaid or rendered on top of a background 1104. The background 1104 may be a graphical representation of the terrain, topology, or other suitable items or points of interest, which may be maintained by the flight management system 106 in a database 112, as will be understood. As described in greater detail below, the flight management system 106 may also render the graphical IFR procedure depictions 1106 (in this embodiment, SIDS) and a legend 1108 containing the associated textual procedure identifications 1110. The legend 1108 textually depicts the runways, transitions and legs associated with an IFR procedure. In this case, the pilot has positioned the cursor over RIMM1, a SID which has five SID transitions. SIDs and SID transition are similar to approaches and approach transitions in that they are displayed as the pilot moves his cursor over the textual procedure identifications, one SID and it's transitions at a time so as to not clutter the display with multiple SIDs at a time. The flight management system 106 may be configured to render or display a graphical representation of the departure airport 1107 on the navigational map 1100, as will be understood.

Although FIG. 11 depicts a lateral view, e.g., from above the aircraft, of the navigational map 1100, in practice, alternative embodiments may utilize various perspective views, such as vertical profiles, three-dimensional views, e.g., a three-dimensional synthetic vision display, angular or skewed views, and the like. Further, in some embodiments, the aircraft preferably is shown as traveling across the map 1100, typically referred to as a moving map, as opposed to being located at a fixed position on the map 1100, and FIG. 11 does not limit the scope of the subject matter in any way.

In another exemplary embodiment, the map 1100 is associated with the movement of the aircraft, and the background 1104 refreshes or updates as the aircraft travels, such that the graphical representation of the aircraft is positioned over the background 1104 in a manner that accurately reflects the instantaneous (or substantially real-time) real-world positioning of the aircraft relative to the earth. In accordance with one embodiment, the map 1100 is updated or refreshed such that it is centered on and/or aligned with the aircraft. Although the navigational map 1100 shown in FIG. 11 is oriented north-up, i.e., moving upward on the map 1100 corresponds to traveling northward, as described below, in other embodiments, the navigational map 1100 may be oriented track-up or heading-up, i.e., aligned such that the aircraft is always traveling in an upward direction and the background 1104 adjusted accordingly.

Optionally, a vertical profile (not shown) may be displayed on the navigational map 1100, including navigation reference points and a departure path.

The legend 1108, or list, of the textual procedure identifications 1110, is preferably displayed on a side or in a corner of the display screen so as to not interfere with the remainder of the information displayed. Each textual procedure identification 1110 in the column 1112 represents one of the graphical IFR procedure depictions 1106 a SID (in this exemplary embodiment) displayed on the display screen 1100. The textual procedure identifications 1110 in the column 1114 represents a departure, associated with a SID, from the airport 1107. As is seen, there are many graphical IFR procedure depictions 1106 displayed on the map 1100, which may make it difficult for the pilot to determine which graphical IFR procedure depiction 1106 he is to follow. Furthermore, with so many graphical IFR procedure depictions 1106, the listing of the textual procedure identifications 1110 are also so numerous so not all of the associated textual procedure identifications 1110 can be displayed in the column 1112.

Figure 12:
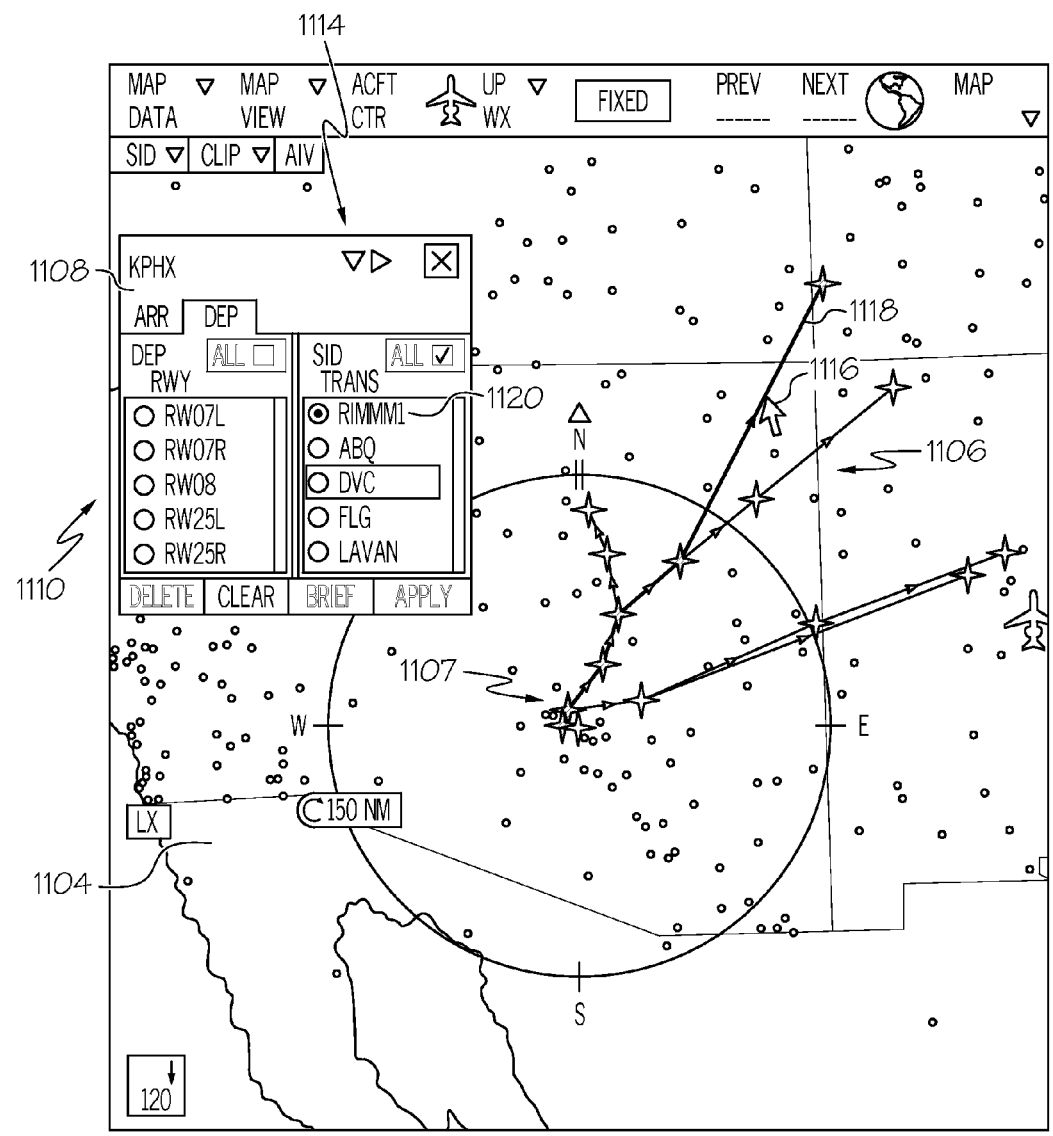

Referring to FIG. 12 and in accordance with the third exemplary embodiment, a cursor 1116 is moved over either the SID transition DVC 1118 or the textual procedure identification 1120, causing the SID 1118 and the textual procedure identification 1120 to be highlighted. If the textual procedure identification 1120 was not visible (within the range of textual procedure identifications 1110 being displayed) prior to moving the cursor, the textual procedure identifications 1110 will scroll so as to display the appropriate textual procedure identification 1120. Highlighting as used herein means modifying the format of the graphical IFR procedure depiction 1106 and textual procedure identifications 1110 to distinguish from other graphical IFR procedure depictions 1106 and textual procedure identifications 1110. The highlighting may, for example, be a changing of color or brightness. And while a cursor is taught in the exemplary embodiments described herein, other methods known in the computer industry may be used to highlight and select the desired graphical IFR procedure depiction 1106 and textual procedure identification 1110.

Figure 13:
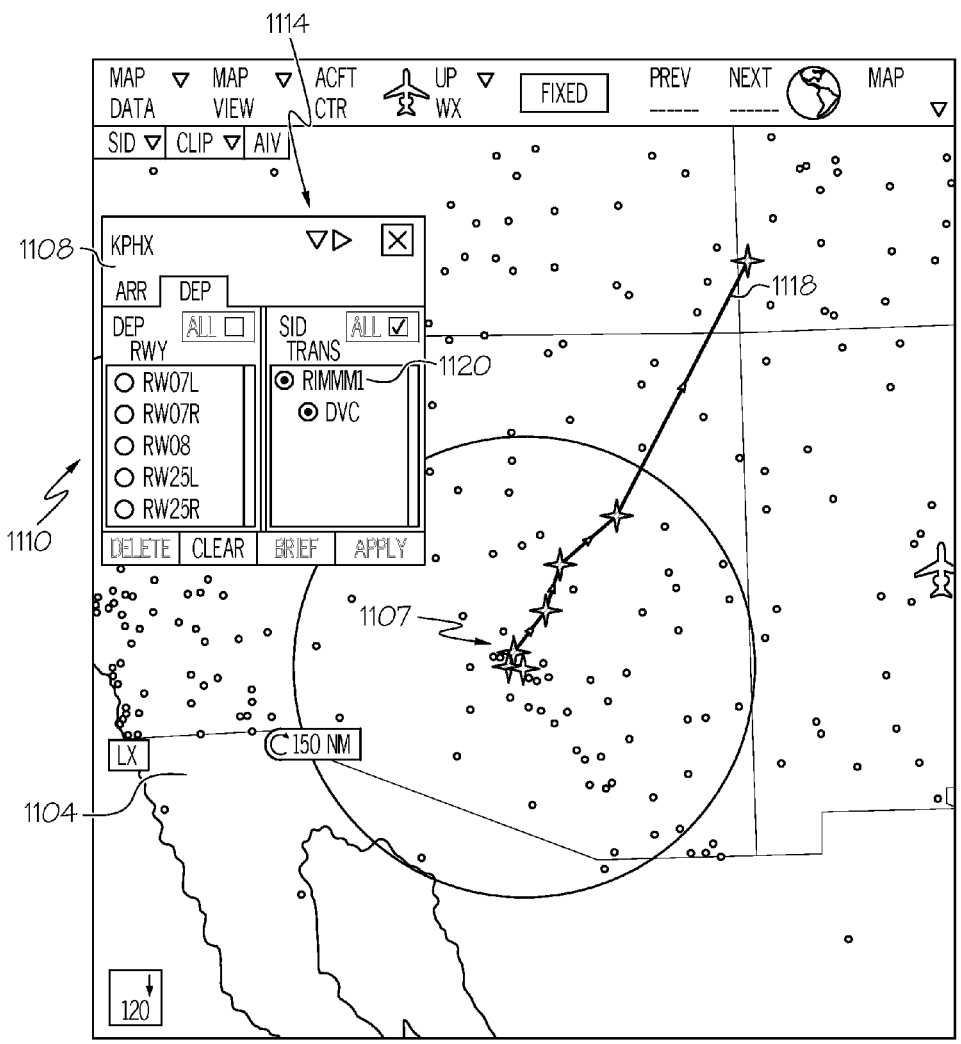

If the pilot determines the highlighted graphical IFR procedure depiction 1106 and textual procedure identification 1110 are as desired, he would simply select either the highlighted graphical IFR procedure depiction 1106 or the textual procedure identification 1110, for example, by clicking a push button. When the selection is made, the other graphical IFR procedure depictions 1106 and textual procedure identifications 1110 would be removed from the display 1100 (see FIG. 13).

To briefly summarize, the methods and systems described above allow a user, such as a pilot or crew member, to quickly identify and recognize the desired approach or departure. This information can quickly and reliably be determined without the use of paper charts or the need to manually orient the approach or departure based on the current heading of the aircraft. The approach or departure may be displayed overlying the navigational map, and may be oriented as desired to provide greater situational awareness to a user.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for a display system to display a selected graphical procedure depiction on a display, comprising: displaying a plurality of graphical procedure depictions on a map, each graphical procedure depiction of the plurality of graphical procedure depictions corresponding to a respective procedure of a plurality of procedures; displaying a list including one or more of a plurality of textual procedure identifications on the map, each textual procedure identification of the plurality of textual procedure identifications corresponding to a respective procedure of the plurality of procedures and having a respective graphical procedure depiction of the plurality of graphical procedure depictions on the map associated therewith; when a cursor is moved over a first graphical procedure depiction of the plurality of graphical procedure depictions on the map, highlighting the first textual procedure identification displayed in the list to distinguish from other textual procedure identifications of the plurality of textual procedures in the list and highlighting the first graphical procedure depiction displayed on the map to distinguish from other graphical procedure depictions of the plurality of graphical procedure depictions on the map, the first textual procedure identification being associated with the first graphical procedure depiction; characterizing the highlighted first textual procedure identification and the highlighted first graphical procedure depiction as selected; and removing the other textual procedure identifications of the plurality of textual procedure identifications from the list and the other graphical procedure depictions of the plurality of graphical procedure depictions from the map other than the selected first textual procedure identification and the selected first graphical procedure depiction.

2. The method of claim 1 wherein only a portion of the textual procedure identifications are displayed in the list, the method further comprising:
scrolling through the textual procedure identifications to display the highlighted first textual procedure identification in the list.

3. The method of claim 1 wherein the graphical procedure depictions and the associated textual procedure identification consist of approaches to an airport.

4. The method of claim 1 wherein the graphical procedure depictions and the associated textual procedure identification consist of departures from an airport.

5. The method of claim 1, the map having a lateral view including a graphical representation of terrain, wherein displaying plurality of graphical procedure depictions comprises displaying the plurality of graphical procedure depictions overlying the graphical representation of terrain on the lateral view of the map.

6. The method of claim 1, wherein displaying the list comprises displaying a legend including the one or more of a plurality of textual procedure identifications on a side or corner of the display.

7. The method of claim 1, wherein:
displaying the list comprises displaying a legend including the one or more of a plurality of textual procedure identifications; and removing the other textual procedure identifications comprises removing the legend from the display.

8. The method of claim 1, wherein the highlighting comprises highlighting the first textual procedure identification in the list when the cursor is dragged over the first graphical procedure depiction on the map.

9. The method of claim 1, further comprising scrolling through one or more of the plurality of textual procedure identifications to display the first textual procedure identification in the list when the first textual procedure information was not visible prior to moving the cursor.

10. The method of claim 1, wherein each respective procedure of the plurality of procedures is selected from the group consisting of standard terminal arrival routes, standard terminal arrival route transitions, approaches, approach transitions, standard instrument departures, and standard instrument departure transitions, each of the standard terminal arrival routes, standard terminal arrival route transitions, approaches, approach transitions, standard instrument departures, and standard instrument departure transitions.

11. A method for a display system to display a selected graphical procedure depiction on a display, comprising: displaying a plurality of graphical procedure depictions on a lateral view of a moving map, each graphical procedure depiction of the plurality of graphical procedure depictions corresponding to a respective procedure of a plurality of procedures, and each respective procedure of the plurality of procedures being selected from one of the group consisting of standard terminal arrival routes, standard terminal arrival route transitions, approaches, approach transitions, standard instrument departures, and standard instrument departure transitions, each of the standard terminal arrival routes, standard terminal arrival route transitions, approaches, approach transitions, standard instrument departures, and standard instrument departure transitions; displaying a list including one or more of a plurality of textual procedure identifications, each textual procedure identification of the plurality of textual procedure identifications corresponding to a respective procedure of the plurality of procedures and having a respective graphical procedure depiction of the plurality of graphical procedure depictions on the lateral view of the moving map associated therewith; when a first graphical procedure depiction of the plurality of graphical procedure depictions on the lateral view of the moving map is identified, highlighting both the first textual procedure identification displayed in the list to distinguish from other textual procedure identifications of the plurality of textual procedures in the list and the first graphical procedure depiction displayed on the lateral view of the moving map to distinguish from other graphical procedure depictions of the plurality of graphical procedure depictions on the lateral view of the moving map, the first textual procedure identification being associated with the first graphical procedure depiction; characterizing the identified first textual procedure identification and the identified first graphical procedure depiction as selected; and removing the other textual procedure identifications from the list and the other graphical procedure depictions from the lateral view other than the selected first textual procedure identification and first graphical procedure depiction.

12. The method of claim 11 wherein the highlighting comprises moving a cursor over either the first textual procedure identification or the first graphical procedure depiction.

13. The method of claim 12 wherein the characterizing comprises actuating a button.

14. The method of claim 11 wherein only a portion of the textual procedure identifications are displayed in the list, the method further comprising:
scrolling through the textual procedure identifications to display the highlighted first textual procedure identification in the list.

15. The method of claim 11 wherein the graphical procedure depictions and the associated textual procedure identification consist of approaches to an airport.

16. The method of claim 11 wherein the graphical procedure depictions and the associated textual procedure identification consist of departures from an airport.

17. A display system for displaying a plurality of textual procedure identifications and a plurality of graphical procedure depictions, the display system comprising: a system configured to determine the plurality of textual procedure identifications for display in a legend, and the plurality of graphical procedure depictions for display on a lateral view of a moving map, each of the textual procedure identifications associated with one of the graphical procedure depictions on the lateral view of the moving map, wherein the graphical procedures and the textual procedure identifications comprise one of the group consisting of standard terminal arrival routes, standard terminal arrival route transitions, approaches, approach transitions, standard instrument departures, and standard instrument departure transitions, each of the standard terminal arrival routes, standard terminal arrival route transitions, approaches, approach transitions, standard instrument departures, and standard instrument departure transitions; a processor coupled to the system and configured to: highlight both a first textual procedure identification of the plurality of textual procedure identifications in the legend to distinguish from textual procedure identifications of the plurality of textual procedures in the legend other than the first textual procedure identification and an associated first graphical procedure depiction of the plurality of graphical procedure depictions on the lateral view of the moving map to distinguish from graphical procedure depictions of the plurality of graphical procedure depictions on the lateral view of the moving map other than the first graphical procedure depiction when a cursor is moved over the first graphical procedure depiction on the lateral view of the moving map; characterize the highlighted first textual procedure identification and the first graphical procedure depiction as selected in response a command from the system; and remove the textual procedure identifications of the plurality of textual procedure identifications from the legend and the graphical procedure depictions of the plurality of graphical procedure depictions from the lateral view other than the selected first textual procedure identification and first graphical procedure depiction.

18. The display system of claim 17 wherein only a portion of the textual procedure identifications are displayed in the legend, the processor is further configured to:
scrolling through the textual procedure identifications to display the highlighted first textual procedure identification in the legend.

19. The display system of claim 17 wherein the graphical procedure depictions and the associated textual procedure identification consist of approaches to an airport.

20. The display system of claim 17 wherein the graphical procedure depictions and the associated textual procedure identification consist of departures from an airport.

* * * * *